S. THORESEN.
STUMP PULLING APPARATUS.
APPLICATION FILED FEB. 5, 1920.
1,399,092.
Patented Dec. 6, 1921.
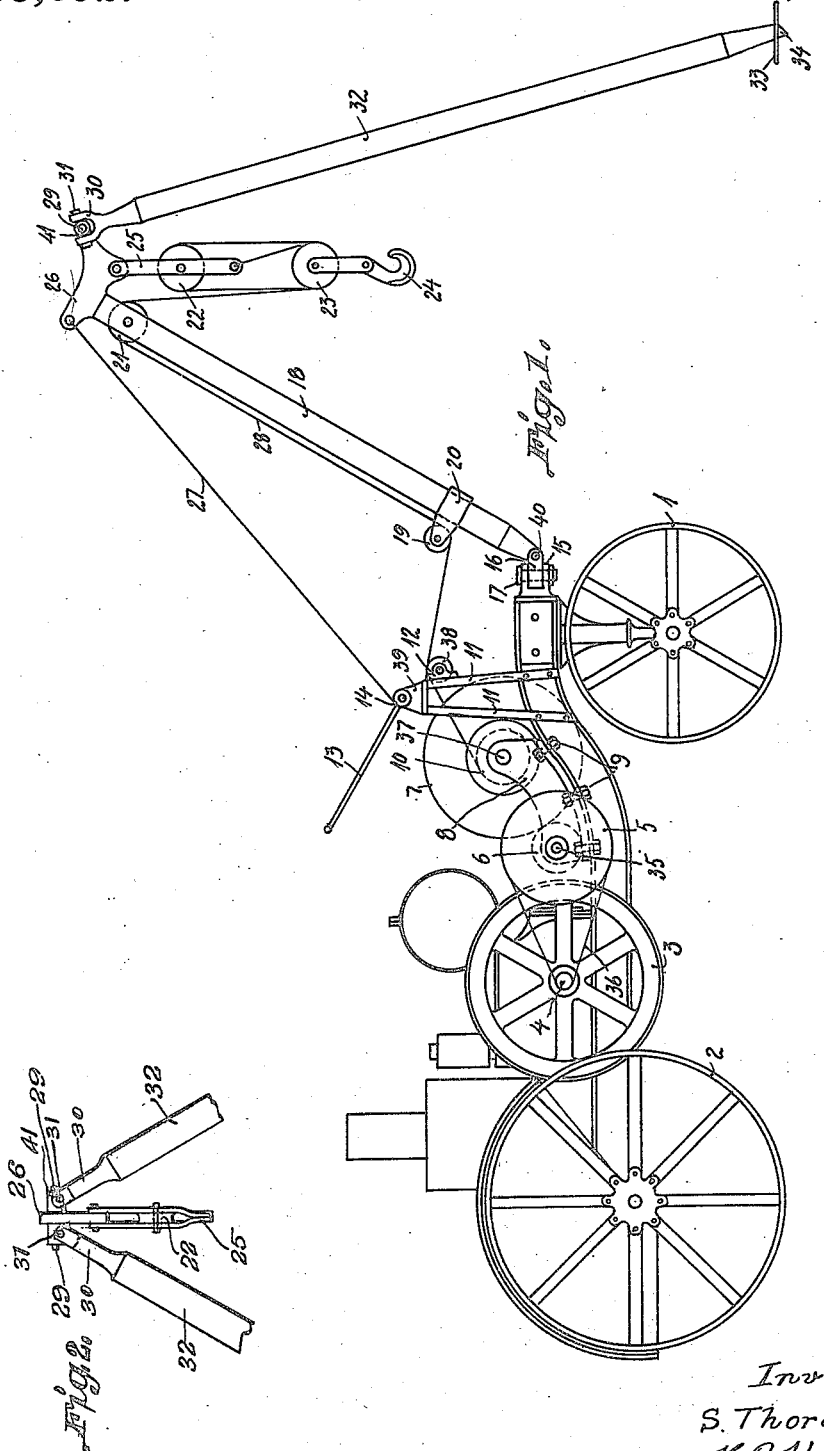
Inventor
S. Thoresen.
By H. R. Kerslake
Atty

UNITED STATES PATENT OFFICE.

SVERRE THORESEN, OF GAARDER, GARDERMOEN, NORWAY.

STUMP-PULLING APPARATUS.

1,399,092. Specification of Letters Patent. Patented Dec. 6, 1921.

Application filed February 5, 1920. Serial No. 356,532.

*To all whom it may concern:*

Be it known that I, SVERRE THORESEN, citizen of Norway, residing at Gaarder, Gardermoen, Norway, have invented certain new and useful Improvements in Stump-Pulling Apparatus, of which the following is a specification.

In pulling up stumps prior to the present invention, special devices were employed, which had to be transported from one stump to another and to be rearranged and assembled at each new working position. With such mechanism, however, much time is lost and the cost of the stump pulling is so heavy that the value of the cleared field or land is not commensurate with the expense involved.

The object of the present invention is to provide improved mechanism for pulling stumps and to combine this mechanism with an ordinary motor tractor, so that the stump pulling mechanism may be transported by the tractor from one stump to another, and upon arriving at each stump, will at once be ready for operation on that particular stump.

A further object of that invention is to furnish stump pulling mechanism which may be readily attached to and detached from an ordinary motor tractor, so that the motor tractor may be used for other purposes than stump pulling when desired.

With the foregoing objects outlined and with other objects in view which will appear as the description proceeds, the invention consists in the novel features hereinafter described in detail, illustrated in the accompanying drawing, and more particularly pointed out in the appended claim.

Referring to the drawing:

Figure 1 is a side view of an ordinary tractor provided with my improved stump pulling mechanism and showing the stump pulling mechanism in position to raise a stump.

Fig. 2 is a detail front view of the upper portion of the stump pulling mechanism.

In the drawings, 1 designates the front wheels of the tractor and 2 the driving wheels of the same. 3 is the fly wheel of the motor which is mounted on the tractor. Between the motor and the driving wheels is arranged coupling mechanism (not shown) preferably combined with a reversing gear (not shown), so that the tractor as desired may be moved forward and backward, or be stopped without the necessity of stopping of the motor. In the constructional form shown in the drawing, a belt pulley —4— is fixed to the shaft of the fly-wheel. In a supporting bracket —8— fastened to the tractor frame by means of screws —9—, an intermediate shaft —35— is arranged. This shaft carries a pulley —5—, so that it may be driven from the pulley —4— by means of the belt —36—. Upon the intermediate shaft —35— is mounted a toothed wheel —6—, which preferably by means of a frictional coupling (not shown) may be coupled to the shaft. The toothed wheel —6— engages another toothed wheel —7— upon the shaft —37—, which is carried by the bracket —8—. The shaft —37— carries a hoisting drum —10— for the stump-puller-line or chain —28—. It is evident, that the belt transmission —4— may be replaced by any other suitable transmission-arrangement. —11— denotes a stand which is connected with the tractor frame by means of screws or the like and carries bearings —12— for a guiding roll —38— for the hoisting line —28—. In a bearing —39— upon the stand —11—, a drum —14— is arranged, which may be rotated by means of a handle —13— and serves for the working of the regulating line —27— of the stump-puller. The stump-puller proper consists of a cantaliver —18—, which by means of a horizontal pin —40— is pivotally connected with an oscillating or swinging link —16—, which by means of a vertical pin —17— is pivotally mounted for horizontal movement in a fork or yoke —15— carried by the tractor frame. At its upper end the cantaliver —18— carries a head piece —26—, to which one end of the regulating or adjusting line —27— is fastened. A link —25—, supported by the head piece, carries the upper pulley —22— of a block-pulley or tackle for lifting the stump with the motive power at hand. In the lower block —23— of the tackle, the hoisting block —24— is placed. At each side of the head —26— a swinging piece —41— is placed upon a horizontal journal. To the said swinging pieces, the support rods —32— are pivotally connected by means of pivots —31— and one support rod —32— is placed at each side of the head —26—. Each rod —32— is equipped at its lower end with a socket having a baseplate —33— provided with a beak —34— intended to be pressed into the ground. In this way the rods —32—, when the apparatus is used, will have sufficient bearing area to take up the pressure without sinking into the ground, and the beak —34— will secure the position of the rods. Upon the cantaliver —18— a strap —20— is fixed, which carries a guide roll —19— for the hoisting line. Another guide roll —21— is mounted on the upper part of the cantaliver.

When the apparatus is to be used for stump-pulling, the tractor is driven forward with the cantaliver raised. The rods —32— should preferably be manually supported while the tractor is in motion. The tractor having arrived at the stump to be pulled, the cantaliver —18— is lowered by means of the line —27—. Simultaneously the head —26— is adjusted by means of the rods 32, so that the tackle is situated perpendicularly over the stump. The rods —32— are now fixed in place and the gin-strap or chain (not shown) is fastened to the stump and hung upon the hook —24—, whereupon the hoisting mechanism is coupled in and the stump is drawn out. If the stump is light, it may be lifted away to the side without moving the rods —32—. If it is too heavy, however, to be removed for instance by two workmen, the cantaliver may be used for this purpose. In order to effect this, the cantaliver —18— is raised by means of the cable —27— so that the rods may be lifted out of engagement with the ground. By pulling one of the rods —32— and pushing with the other, the cantaliver —18— with the tackle and the stump may now be swung to the side, whereupon the hoisting line —28— is loosened and the stump is lowered.

If it is desired to use the tractor for plowing, it is only necessary to loosen the hoisting and adjusting ropes —28— and —27—, and then the cantaliver —18— and the rods —32— may be released from the machine by removing the pin —40—.

As will be seen, it is not necessary to rebuild the tractor in order to render the same suitable for the described purpose. It is only necessary to attach the frames —8— and —11—, and the parts with which they coöperate.

The fork —15— will usually be present in the form of a draw-strap. If not it may easily be fixed upon the tractor frame.

A convenient method of working in accordance with the invention, consists in this, that the tractor—with the plow attached to it—is driven over an area whose width corresponds to the radius of action of the hoisting device, the stones and stumps being deposited at one side of the apparatus. When this space or strip of field has been plowed the adjacent space is treated in a similar manner, the stumps and stones from this being deposited upon the previously plowed space, from which they may be removed later on.

Having now described my invention, what I claim as new and desire to secure by Letters-Patent is:

The combination with a tractor, of a fork attached to the same, a cantaliver pivotally connected to the fork and mounted for horizontal and vertical oscillations, a head for the cantaliver, links pivotally connected to said head, support rods pivotally connected to said links and designed to have their lower ends engage the surface of the soil when a stump is being raised, said rods also being manually operable by th operator for shifting the head of the cantaliver from side to side, and hoisting mechanism supported by the tractor, cantaliver, and rods.

In testimony whereof I affix my signature.

SVERRE THORESEN.

Witnesses:
 AXEL LAHN,
 HANS HALL.